(12) United States Patent
Tatlock

(10) Patent No.: US 8,156,980 B2
(45) Date of Patent: Apr. 17, 2012

(54) SIDEWALL PROTECTOR RIBS

(75) Inventor: Ronald W. Tatlock, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 720 days.

(21) Appl. No.: 12/328,244

(22) Filed: Dec. 4, 2008

(65) Prior Publication Data

US 2010/0139830 A1    Jun. 10, 2010

(51) Int. Cl.
    *B60C 13/02*    (2006.01)
(52) U.S. Cl. .... 152/523; 152/524; 152/154; 152/209.16
(58) Field of Classification Search ................ 152/154,
        152/209.11, 209.16, 523, 524, 555
    See application file for complete search history.

(56) References Cited

U.S. PATENT DOCUMENTS

| | | | | |
|---|---|---|---|---|
| 1,448,286 A | * | 3/1923 | Comstock ..................... | 152/523 |
| D153,434 S | | 4/1949 | Hoelzer ............................ | 90/20 |
| 2,789,616 A | * | 4/1957 | Cuthbertson et al. ......... | 152/523 |
| 2,938,560 A | * | 5/1960 | Wallace et al. ......... | 152/209.22 |
| 3,204,681 A | * | 9/1965 | Olagnier et al. ............. | 152/154 |
| 3,253,634 A | * | 5/1966 | De Young ..................... | 152/524 |
| D206,646 S | | 1/1967 | Makris ............................. | 90/20 |
| 3,399,257 A | * | 8/1968 | Ueno ........................... | 152/523 |
| 3,515,196 A | * | 6/1970 | James .......................... | 152/454 |
| 3,811,488 A | * | 5/1974 | Duncan ........................ | 152/523 |
| 3,830,274 A | * | 8/1974 | Waser, Jr. ...................... | 152/524 |
| 3,841,373 A | * | 10/1974 | Gilreath ........................ | 152/523 |
| T973,006 I4 | * | 8/1978 | Beyers .......................... | 152/523 |
| 4,219,066 A | | 8/1980 | Tamura et al. ................ | 152/353 |
| 4,356,985 A | * | 11/1982 | Yeager et al. ................. | 152/523 |
| 4,699,193 A | | 10/1987 | Bryant et al. ................ | 152/523 |
| 4,711,283 A | * | 12/1987 | Bonko et al. ............ | 152/209.12 |
| 4,809,757 A | | 3/1989 | Shurman .................... | 152/523 |
| 4,815,511 A | * | 3/1989 | Brayer et al. ............ | 152/209.14 |
| 4,881,586 A | * | 11/1989 | Shinomiya ............... | 152/209.12 |
| 4,926,918 A | * | 5/1990 | Demor et al. ................ | 152/523 |
| 4,982,773 A | | 1/1991 | Bonko .......................... | 152/209 |
| 5,645,660 A | | 7/1997 | Attinello et al. ............. | 152/523 |
| D389,104 S | | 1/1998 | Morgan ......................... | 12/147 |
| 6,189,586 B1 | * | 2/2001 | Guidry .......................... | 152/523 |
| 6,257,290 B1 | * | 7/2001 | Sakamoto et al. ............ | 152/523 |
| D447,449 S | | 9/2001 | Guspodin ...................... | 12/152 |

(Continued)

FOREIGN PATENT DOCUMENTS

JP    55091408 A    *    7/1980

(Continued)

OTHER PUBLICATIONS

JPO Englsih Abstract of JP 55091408, 1980.*

(Continued)

*Primary Examiner* — Joseph Del Sole
*Assistant Examiner* — Timothy Kennedy
(74) *Attorney, Agent, or Firm* — Matthew W. Jupina; Wayne Beavers

(57) ABSTRACT

A pneumatic tire for use with telescopic material handlers includes a first concentrically continuous sidewall protector rib projecting axially outward from the sidewall and located above a midpoint of the sidewall. A second non-continuous sidewall protector rib is located concentrically outward of the first sidewall protector rib. The tire is a relatively low aspect ratio tire having a relatively flat sidewall profile. This provides a tire having the advantage of added sidewall protection without increasing the overall width of the inflated tire.

23 Claims, 6 Drawing Sheets

U.S. PATENT DOCUMENTS

| | | | |
|---|---|---|---|
| D449,803 S | 10/2001 | Guspodin et al. | 12/147 |
| 6,533,007 B1 | 3/2003 | McMannis | 152/209.2 |
| 6,666,248 B2 | 12/2003 | Omoto et al. | 152/523 |
| 6,761,198 B2 | 7/2004 | Zanzig et al. | 152/209.5 |
| D495,294 S | 8/2004 | Ochi et al. | 12/604 |
| 6,920,906 B2 | 7/2005 | Allison et al. | 152/209.2 |
| 6,929,044 B1 | 8/2005 | Rodney | |
| 6,941,990 B2 | 9/2005 | Rooney | 152/454 |
| 2001/0020505 A1 | 9/2001 | Zanzig et al. | |

FOREIGN PATENT DOCUMENTS

| | | |
|---|---|---|
| JP | 61-081207 | 4/1986 |
| JP | 63170110 A * | 7/1988 |
| JP | 06-316206 | 11/1994 |
| JP | 2004291937 A * | 10/2004 |

OTHER PUBLICATIONS

JPO Englsih Abstract of JP 63170110, 1988.*

JPO Englsih Abstract of JP 2004291937, 2004.*

Exhibit A: Two page printout regarding the Bridgestone Model VUT G-2, L-2 tire. (undated but admitted to be prior art).

Exhibit B: Two page printout regarding the Bridgestone Model L-3 tire. (undated but admitted to be prior art).

Exhibit C: two page printout regarding the Firestone Model SGG RB G-2, G2/L2 tire. (undated but admitted to be prior art).

Exhibit D: Four pages: three page printout from the Solideal website, fourth page photograph of cross-section cut from Solideal size 13.00-24TG tire. (undated but admitted to be prior art).

Exhibit E: Bridgestone D-LUG tire which has a noncontinuous shoulder protection rib. (undated but admitted to be prior art).

Exhibit F: Five page brochure from the Galaxy Tire Company, re the "Galaxy Super-Sidewall" skid steer tire. (undated but admitted to be prior art).

Chun Hee Kim, International Search Report and Written Opinion from PCT Application PCT/US09/66556, Jul. 1, 2010, 6 pages, Korean Intellectual Property Office, Daejeon, Korea.

* cited by examiner

SIDEWALL PROTECTOR RIBS

BACKGROUND OF THE INVENTION

1. Field of the Invention

The present invention relates generally to pneumatic tires, and more particularly, but not by way of limitation, to pneumatic tires especially designed for use with telescopic material handlers.

2. Description of the Prior Art

Telescopic material handlers are forklift trucks commonly utilized on construction sites. They include a telescoping boom typically with a reach of from 30 to 40 feet, and they can steer in a forward steer or rear steer mode, and also in four wheel steer, crab or crawl modes. Telescopic material handlers must be capable of maneuvering in tight places and they have severe steer angles as high as 86 to 88 degrees at the steered wheels.

Because telescopic material handlers are used on construction sites, they encounter rough terrain littered with much debris such as nails, piles of lumber, broken concrete blocks and the like.

Additionally, because much of such equipment is provided by rental services to the construction contractors, the operators of the telescopic material handlers are often inexperienced drivers.

All of these factors combine to result in a scenario where the tires utilized on the telescopic material handlers can be expected to encounter substantial tire injury due to running over and against debris, sideswiping curbs and other abutments, and backing into obstacles. Many of these tire injuries, particularly the sideswiping of curbs and the like, typically injure the tire at the widest point of the sidewall which is usually near the mid height of the sidewall.

Currently, most telescopic material handlers utilize 24 or 25 inch diameter wheel rims and use tires originally designed for use on road graders and having a tire outside diameter of approximately 51 inches. Typical examples of such current tires produced by the assignee of the present invention include the Bridgestone Model VUT G-2 tire in a 13.00 R 24 size, the Bridgestone Model L-3 tire in a 13.00-24 size and a Firestone Model SGG RB G-2 or G2/L2 tire in a 13.00-24 size. The aspect ratio of these tires, which is defined as the ratio of sidewall height to the total width of the tire as a percentage, is typically relatively high, well in excess of 90 percent and in some cases near 100 percent.

Another typical prior art tire commonly used on telescopic material handlers is the Solideal Model TG tire in a 13.00-24 size which has an overall diameter of 51.1 inches and a section width of 14.4 inches. The Solideal tire also has a relatively high aspect ratio of approximately 96.1 percent. The Solideal 13.00-24 TG tire is advertised as having extra sidewall protection to resist road abuse, and it achieves this by relieving the sidewall area along a wide band at near mid sidewall height and thickening the area above and below the relieved area.

Another approach to providing sidewall protection for construction vehicle tires is shown in U.S. Pat. No. 6,666,248 to Omoto et al. which discloses the use of convex shape sidewall protectors embedded in the sidewall along the midline of the sidewall.

Thus it is seen that there is a continuing need for an effective, economical design for a pneumatic tire especially intended for use on telescopic material handlers which provides improved sidewall protection.

SUMMARY OF THE INVENTION

In one aspect of the present invention a pneumatic tire particularly adapted for use with telescopic material handlers includes first and second sidewall portions and a tread portion extending between the first and second sidewall portions. The tread portion includes a base and at least a first circumferentially spaced row of lugs. Each lug of the first row of lugs includes an axially outer surface facing in generally the same axial direction as does the first sidewall. Each axially outer surface includes an axially outwardly projecting step adjoining the base. A circumferentially continuous sidewall protector rib projects axially outward from the first sidewall portion and is located radially inward of and radially adjacent to the axially outward projecting steps of the axially outer surfaces of the lugs of the first row of lugs. The circumferentially continuous sidewall protector rib projects axially outward further than do the axially outwardly projecting steps.

In another aspect of the present invention a pneumatic tire includes first and second sidewalls with a tread area extending between the first and second sidewalls. The tread area includes an inner tread surface and at least a first circumferential row of lugs extending radially outward from the inner tread surface adjacent the first sidewall. A circumferentially continuous sidewall protector rib includes a radially outer surface defined as an integral extension of the inner tread surface without any surface break line between the radially outer surface and the inner tread surface. The sidewall protector rib also includes an axially outer surface projecting axially at least as far as any other part of the first sidewall to protect the first sidewall from damaging engagement with foreign objects.

In another aspect of the present invention a pneumatic tire includes first and second sidewalls and a tread portion extending between the first and second sidewalls. The tread portion includes a radially inner tread base and a plurality of lugs extending radially outward from the base. The first sidewall has a sidewall height extending radially from a radially innermost part of the first sidewall to a radially outer ground engaging surface of the tread portion. A circumferentially continuous sidewall protector rib is located entirely above 60 percent of the sidewall height. The circumferentially continuous sidewall protector rib projects axially outward at least as far as any other part of the first sidewall. A circumferentially non-continuous sidewall protector rib is located radially outward from and radially adjacent to the circumferentially continuous sidewall protector rib. The circumferentially non-continuous sidewall protector rib projects axially outward beyond the first sidewall a distance less than does the circumferentially continuous sidewall protector rib.

Accordingly, it is an object of the present invention to provide improved tires for use with telescopic material handlers which provide a sidewall protector rib.

Another object of the present invention is the provision of a pneumatic tire having a circumferentially continuous sidewall rib and having a circumferentially non-continuous sidewall rib disposed concentrically outside of the circumferentially continuous sidewall rib.

Still another object of the present invention is the provision of improved designs for sidewall protector ribs for tires.

Another object of the present invention is the provision of a low profile tire with a sidewall protector rib, the tire specifically designed for use with telescopic material handlers and having an aspect ratio of less than 80 percent.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
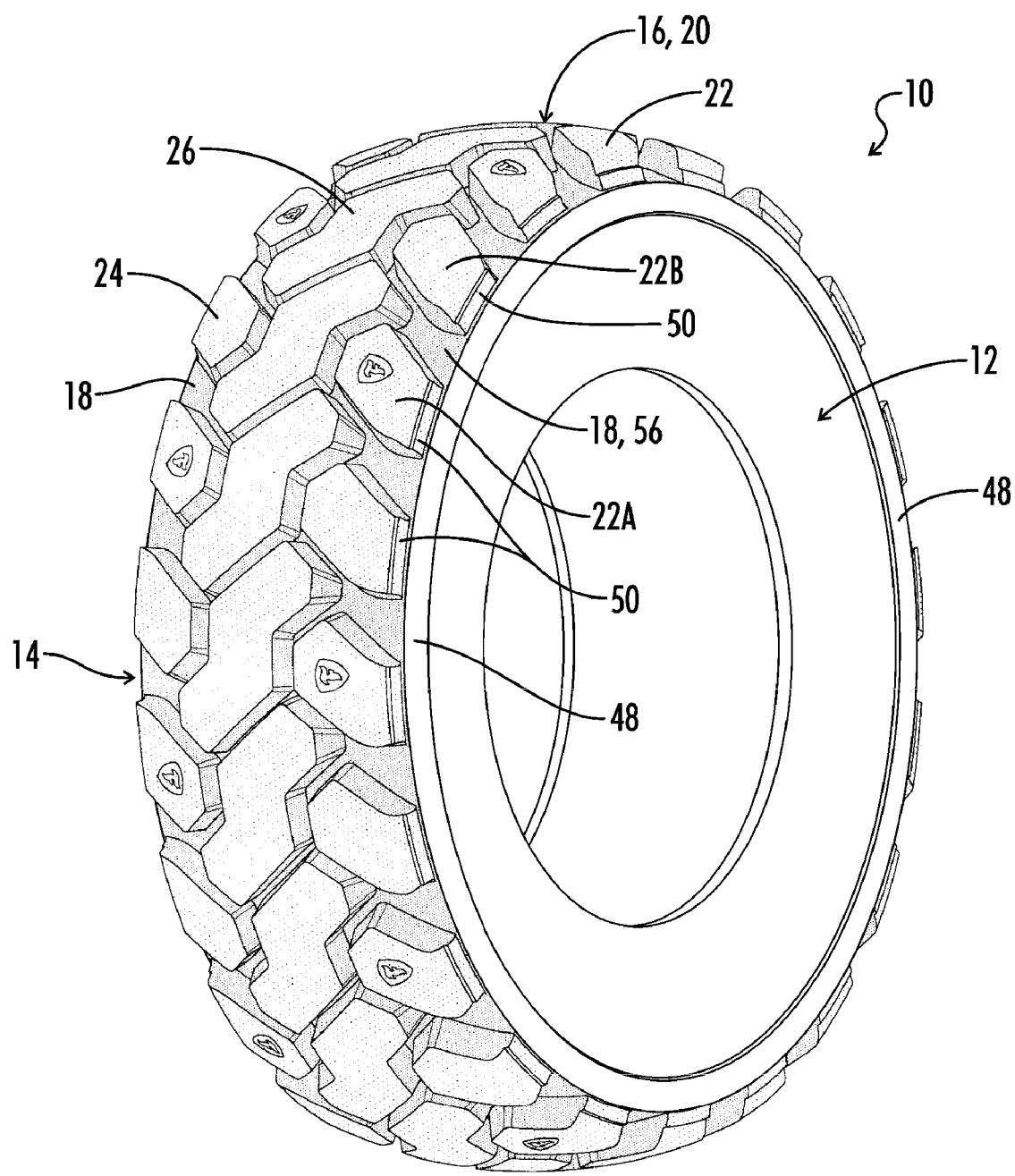
FIG. 1 is a perspective view of a tire including sidewall protector ribs in accordance with the present invention.
Figure 5:
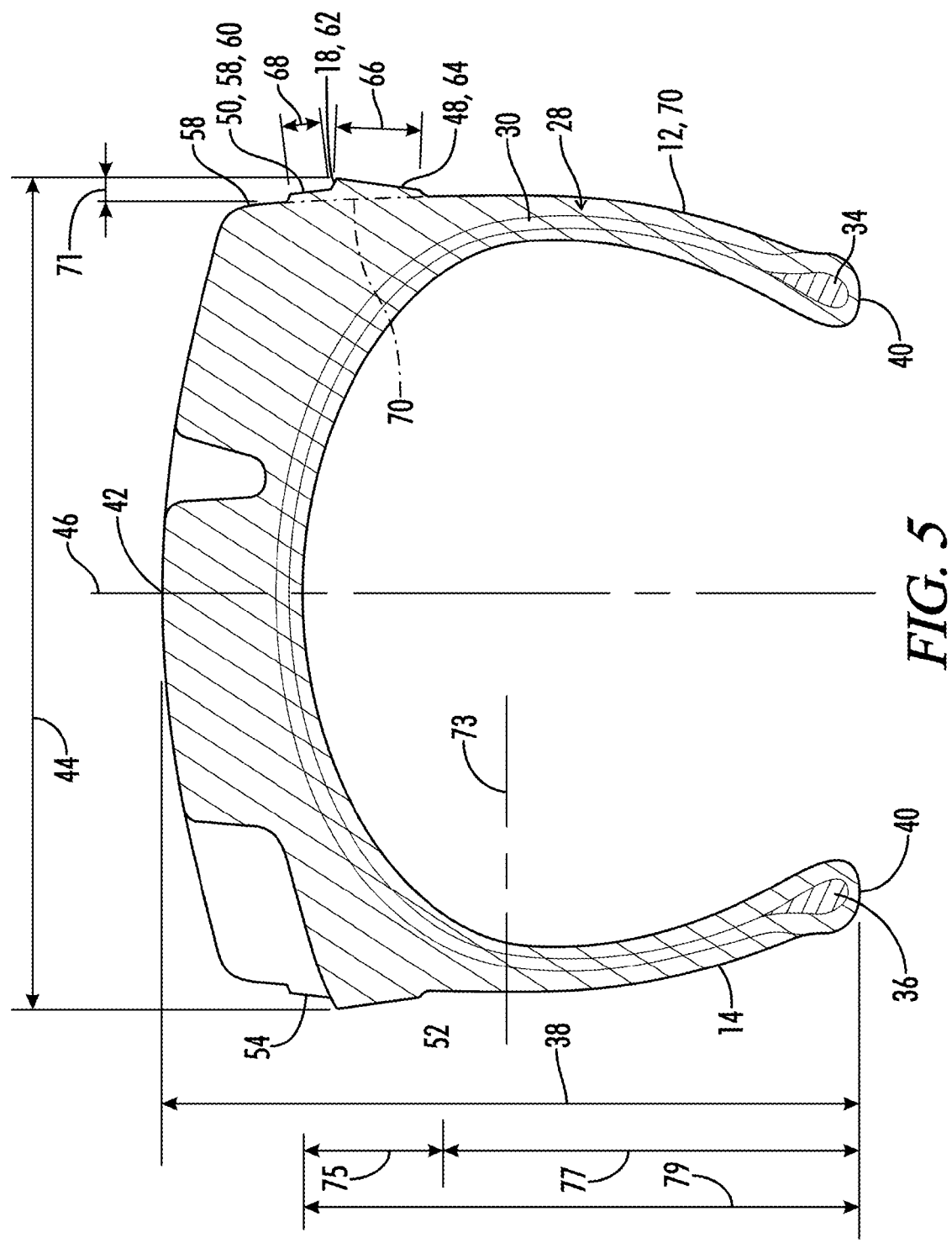
FIG. 5 is a radially sectioned view of the tire of FIG. 1 taken along line 5-5 of FIG. 4.

Referring now to the drawings and particularly to FIGS. 1 and 5, a pneumatic tire 10 includes first and second sidewalls or sidewall portions 12 and 14, and a tread area or tread portion 16 extending between the first and second sidewalls 12 and 14. The tire 10 is particularly suited for use with telescopic material handlers, and with other construction equipment which must traverse rough terrain and which is subject to sidewall tire injury from impacts with construction debris and surroundings.

The tread area 16 includes an inner tread surface or base 18 and a plurality of lugs 20 extending radially outward from the inner tread surface 18.

For the particular tread pattern illustrated, the lugs 20 include three circumferentially spaced rows of lugs namely first and second circumferentially spaced outer rows of lugs 22 and 24, respectively, and a circumferentially spaced central row of lugs 26.

The first circumferentially spaced outer row of lugs 22 can be described as extending radially outward from the inner tread surface 18 adjacent the first sidewall 12. The second row of lugs 24 can be similarly described with reference to the second sidewall 14.

As best seen in FIG. 5, the tire 10 has a carcass 28. The carcass 28 has a plurality of carcass plies 30 extending circumferentially about an axis of rotation 32 (see FIG. 2) of the tire 10. At least one of the carcass plies is anchored on each end to first and second annular beads 34 and 36. The carcass 28 is embedded in the molded rubber sidewall portions 12 and 14 and tread portion 16.

The sidewalls 12 and 14 each have a sidewall height 38 extending radially from a radially innermost edge 40 of the first and second sidewalls 12 and 14 to a radially outer ground engaging surface 42 of the tread area 16. The tire has a maximum section width 44 which in this case spans between the axially outermost projections of the sidewall protector ribs described below. The tire 10 has an equatorial plane 46.

As used herein, references to axial directions refer to directions generally parallel to the rotational axis 32 of the tire 10. References to radial directions refer to directions generally extending along a radius from the rotational axis 32. References to circumferential directions such as the circumferentially spaced row of lugs 22 refer to directions extending around a circumference of the tire 10. The first circumferential row of lugs 22 for example includes circumferentially adjacent lugs 22A and 22B circumferentially spaced from each other by circumferential space 56 which is in part defined by the inner tread surface 18.

In order to provide improved protection to the sidewalls 12 and 14 against injury from running over construction debris and the like or from running against obstacles such as curbs and walls, each of the sidewalls 12 and 14 are provided with an improved sidewall protector rib structure. Thus, the first sidewall 12 has a circumferentially continuous sidewall protector rib 48 about which is concentrically received a circumferentially non-continuous or broken sidewall protector rib 50. Similarly, the second sidewall 14 includes a circumferentially continuous sidewall protector rib 52 and a circumferentially non-continuous sidewall protector rib 54.

Figure 2:
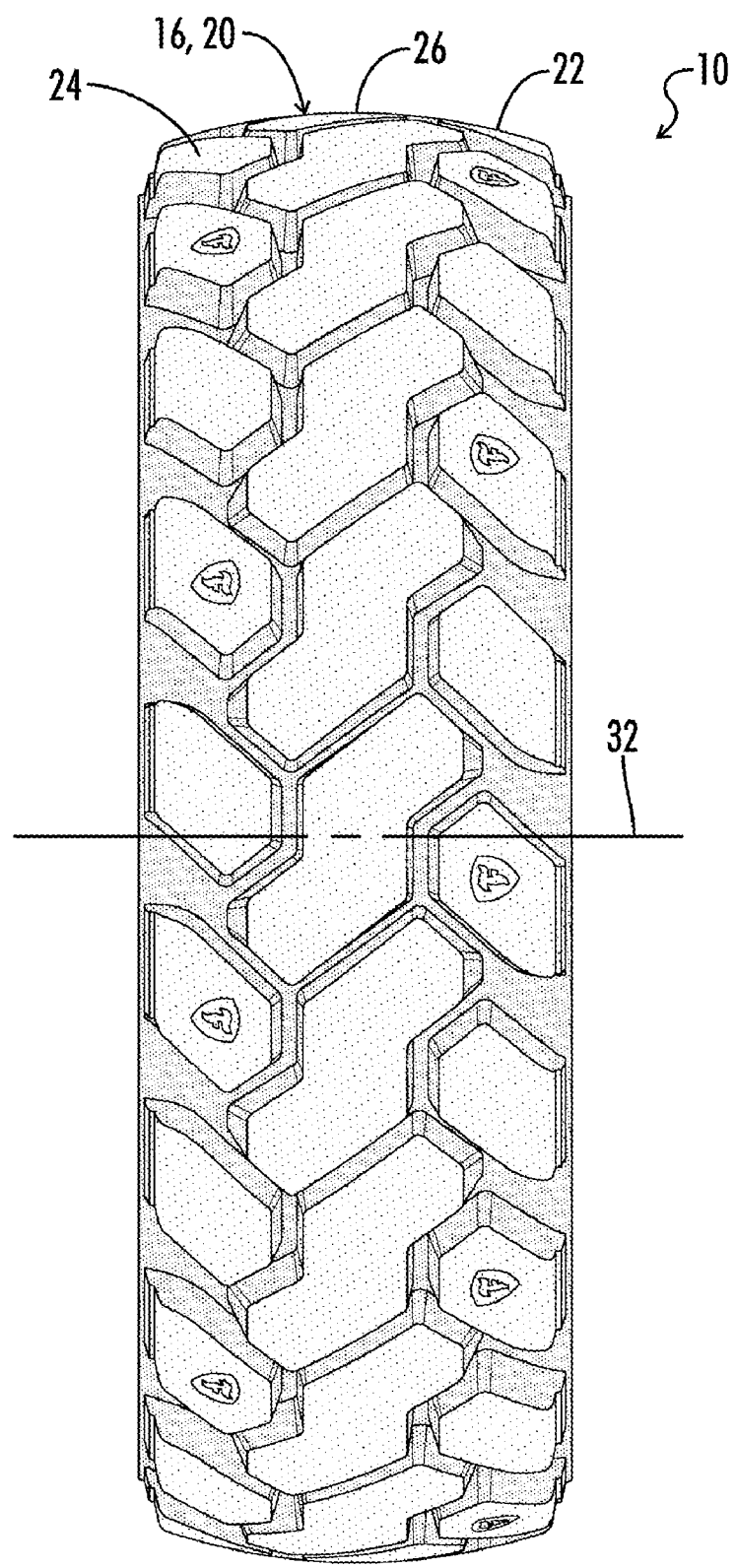
FIG. 2 is a front elevation view of the tire of FIG. 1.
Figure 3:
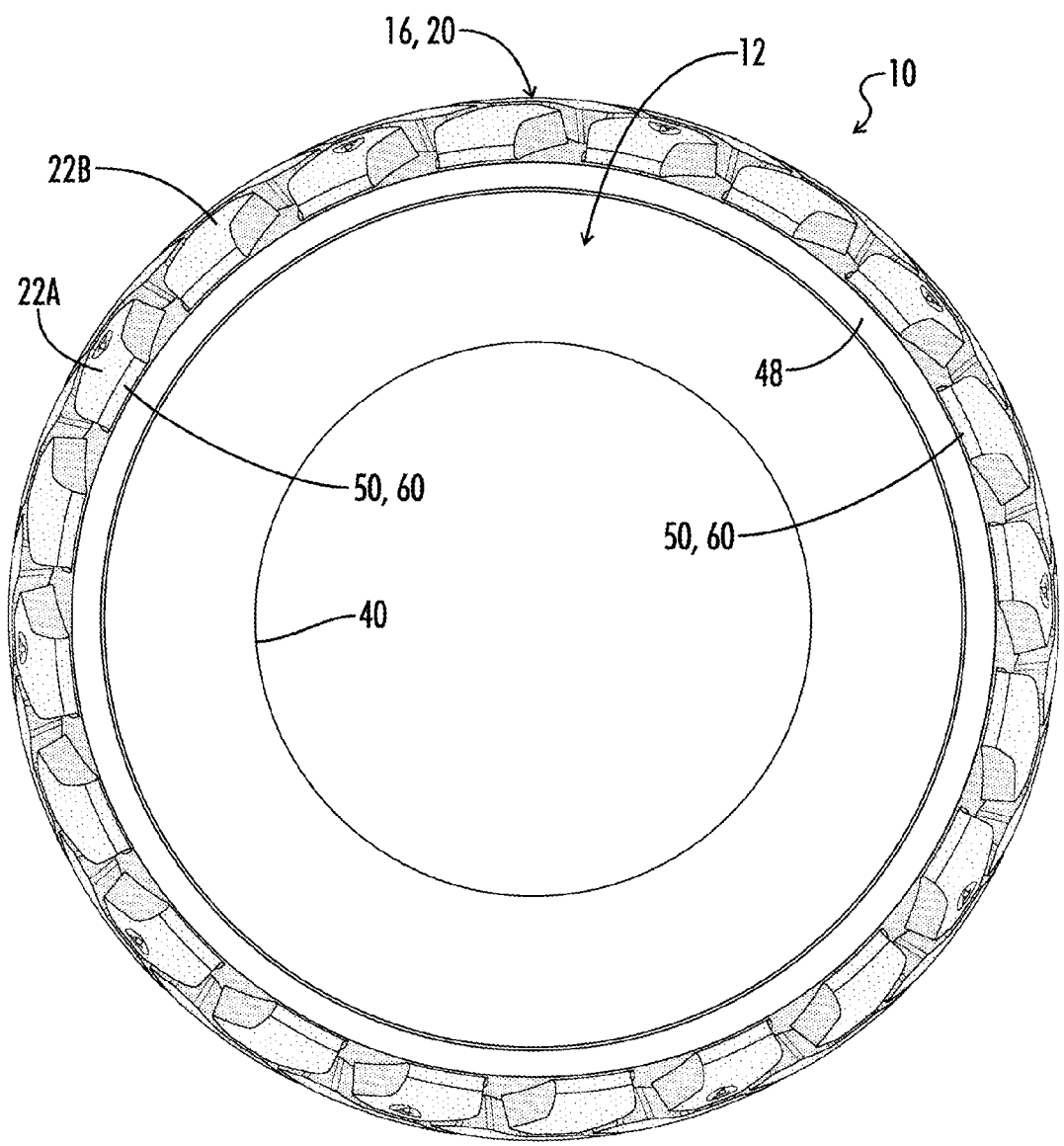
FIG. 3 is a side elevation view of the tire of FIG. 1.
Figure 4:
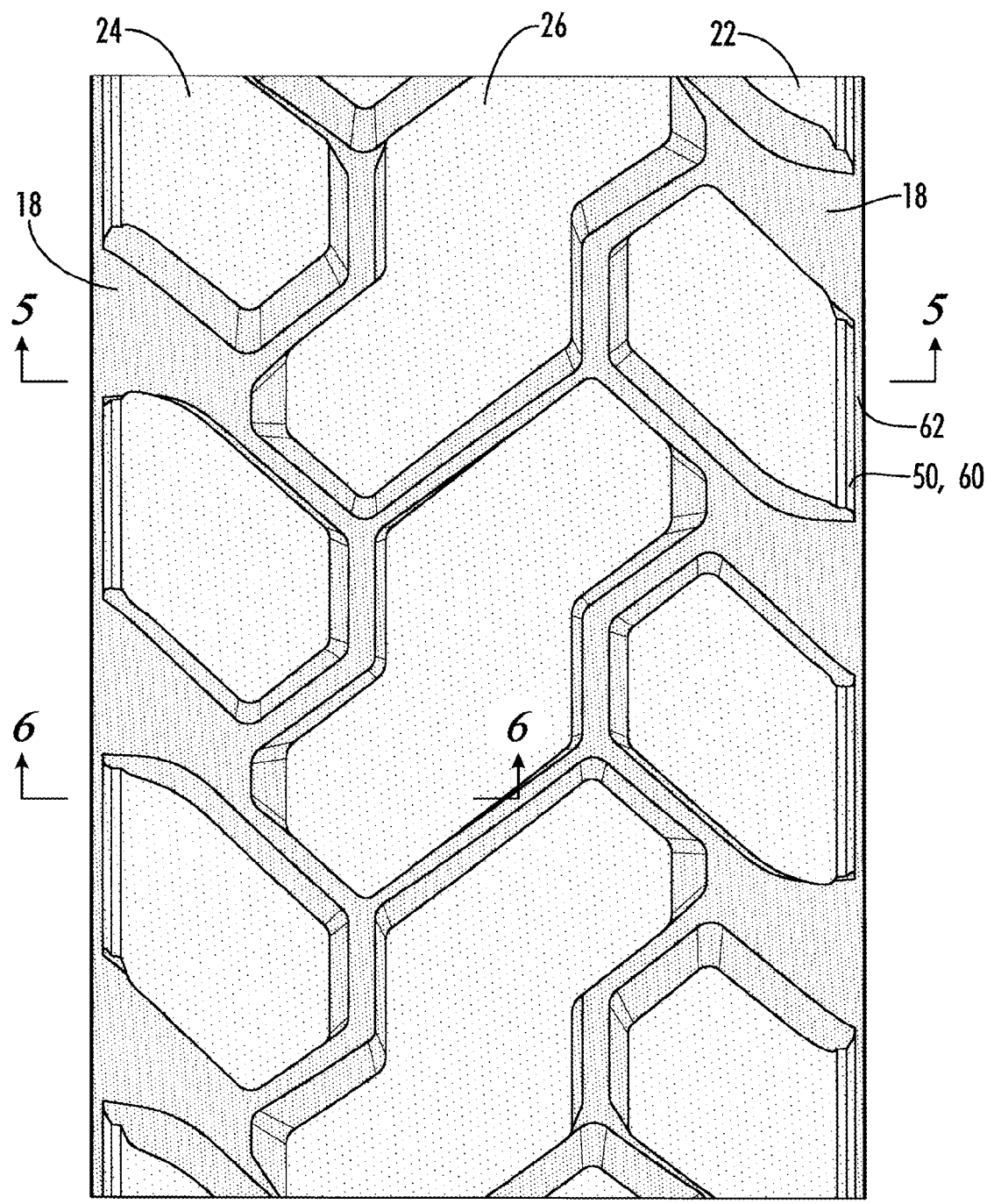
FIG. 4 is an enlarged front elevation view of a portion of the tire of FIG. 1.

Each of the lugs 22 includes an axially outer surface 58 facing in generally the same axial direction as does the first sidewall 12, that is generally to the right as seen in FIGS. 2 and 5. Each axially outer surface 58 includes an axially outwardly projecting step 60 adjoining the inner tread surface 18. As best seen in FIGS. 3 and 5, the axially outwardly projecting steps 60 project axially outward from the first sidewall portion 12 and define the circumferentially non-continuous sidewall protector rib 50 which is concentrically disposed about the circumferentially continuous sidewall protector rib 48.

The circumferentially continuous sidewall protector rib 48 projects axially outward from the first sidewall portion 12 and is located radially inward of and radially adjacent to the axially outward projecting steps 60 of the axially outer surfaces 58 of the lugs 22 of the first row of lugs. The circumferentially continuous sidewall protector rib 48 projects axially outward further than do the axially outward projecting steps 60. It is preferred that the circumferentially continuous sidewall protector rib 48 project axially outward at least as far as any other part of the first sidewall portion 12 when the tire 10 is in an inflated loaded condition. The rib 48 may project axially outward beyond any other part of the first sidewall portion 12.

Figure 6:
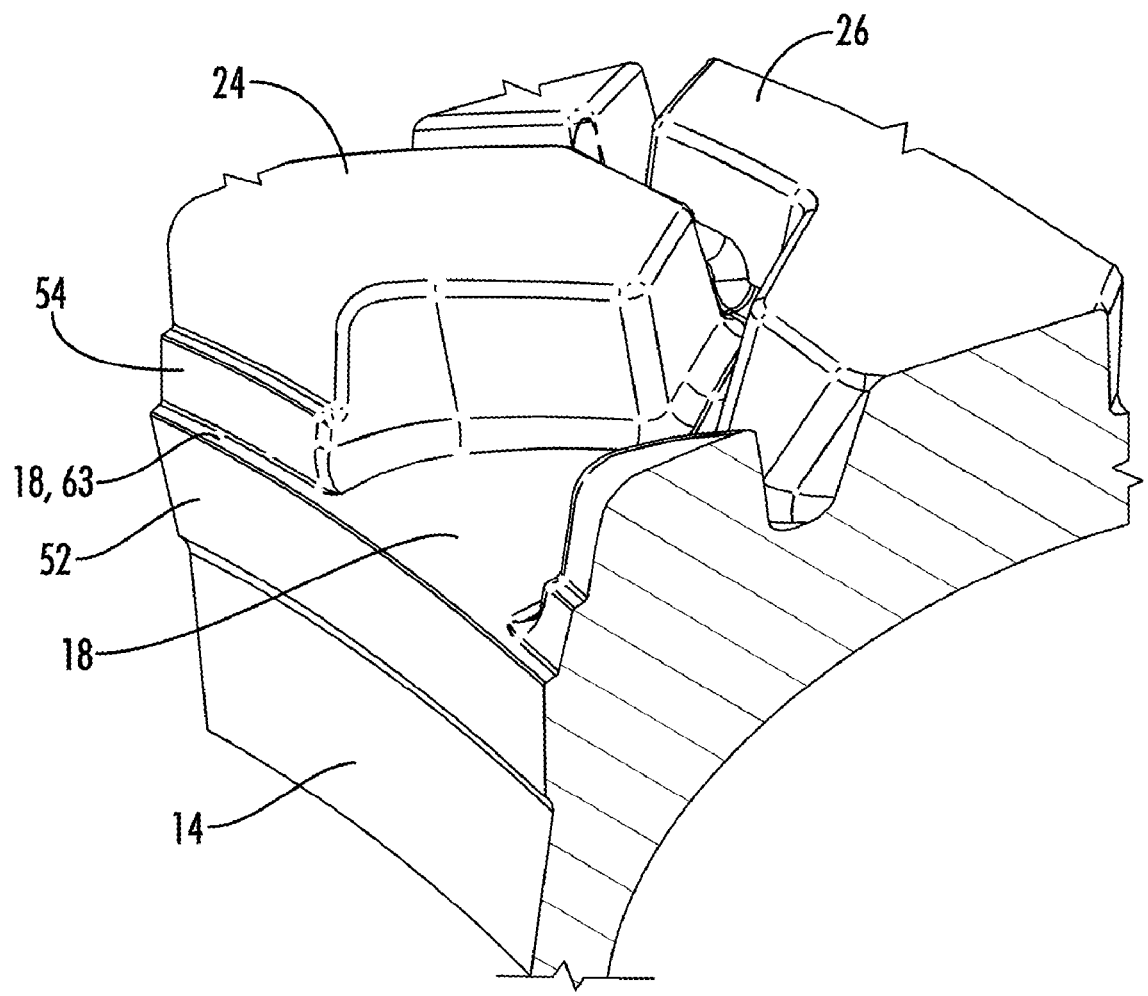
FIG. 6 is a perspective, radially sectioned view of the tire of FIG. 1 taken along line 6-6 of FIG. 4.

As best seen in FIGS. 5 and 6, the circumferentially continuous sidewall protector ribs such as 48 and 52 include radially outer surfaces 62 and 63, respectively, which are integral extensions of the inner tread surface 18 without any surface break line between the radially outer surfaces 62 and 63 and the inner tread surface 18. More generally, the radially outer surfaces 62 and 63 of continuous ribs 48 and 52 can be described as terminating adjacent the inner tread surface 18. The continuous rib 48 further includes an axially outer surface 64 projecting axially at least as far as any other part of the first sidewall portion 12 to protect the first sidewall portion 12 from damaging engagement with foreign objects.

As best seen in FIG. 5, the axially outward facing surface 64 of continuous protector rib 48 and axially outward facing surface 58 of the step 60 of the non-continuous protector rib 50 slope in opposite directions with reference to the equatorial plane 46. The axially outer surface 64 of the circumferentially continuous sidewall protector rib 48 can be described as sloping radially inward toward the rotational axis 32 of the tire 10 and axially inward toward the equatorial plane 46. The axially outward facing surface 58 of the step 60 slopes radially inward toward the rotational axis 32 of tire 10 and axially outward away from the equatorial plane 46.

In the example shown in FIG. 5, for a tire size 370/75-28, the circumferentially continuous sidewall protector rib 48 has a radial width 66 corresponding to axially outwardly facing surface 64 of approximately 1.349 inches. The radial width 66 is preferably at least 1.25 inches. The axially outward facing surface 58 at step portion 60 of the circumferentially non-continuous sidewall protector rib 50 has a radial width 68 of approximately 0.685 inches. As used herein, the "radial width" is that width of the rib 48 or 50 intersected by a radial plane extending from the axis 32 of the tire. In general, the circumferentially continuous sidewall protector rib 48 can be described as having a radial width 66 in a range of from 1.5 to 2.5 times the radial width 68 of circumferentially non-continuous protector rib 50, and more specifically that ratio is at least 1.9 and even more specifically is approximately 2.0.

As best seen in FIG. 5, the first sidewall portion 12 has a smooth continuously curved axially outer sidewall profile 70 when viewed in radial cross-section. Furthermore, that portion of the axially outward facing outer surface 58 of lugs 22 located radially outward above the step 60 coincides with and defines a part of that smooth continuously curved outer sidewall profile 70, as shown by the imaginary extension of profile 70 in phantom lines in FIG. 5.

As is apparent in FIG. 5, both of the sidewall protector ribs 48 and 50 project axially outward beyond that portion of the sidewall profile 70 immediately adjacent the protector ribs. For a tire size 370/75-28, the radially uppermost portion of the axially outward facing surface 64 of continuous protector rib 48 projects beyond the outer sidewall profile 70 immediately adjacent the rib 48 by a distance 71 of at least 0.25 inch and for a tire of size 370/75-28 approximately 0.35 inch. As is also apparent, the continuous sidewall rib 48 projects axially outward from the sidewall profile 70 at least twice as far as does the circumferentially non-continuous sidewall protector rib 50 which for a tire of size 370/75-28 projects axially outward approximately 0.17 inch.

The tire 10 has a relatively low aspect ratio as compared to prior art tires traditionally used on telescopic material handlers. The sidewall profile 70 is relatively flat and vertical as compared to typical prior art tires utilized on telescopic material handlers which tend to be more bulging and rounded with their widest point at the midline of the sidewall height.

This relatively flat, relatively vertical orientation of the sidewall profile 70 substantially aids in the proper functioning of the sidewall protector ribs 48 and 50, thus allowing the distance 71 to be reasonable yet to still project axially outward at least as far as any other part of the sidewall and preferably beyond any other part of the sidewall to provide protection of the sidewall against lateral impacts with foreign objects.

This relatively flat, relatively vertical orientation of the sidewall profile 70 is achieved in part by the mold shape corresponding to the sidewall profile 70 and also in part by the relatively low aspect ratio of the tire.

As used herein, the aspect ratio of a tire is determined by subtracting the wheel diameter from the outside diameter of the tire and dividing that by two to get a tire height and then dividing that tire height by the overall width of the tire in an inflated unloaded condition. In one example of the tire 10 in a tire size 370/75-28, the outside dimension of the tire is approximately 50.3 inches, the overall width is approximately 14.5 inches, and the tire is designed for use on a 28 inch diameter rim, thus resulting in an aspect ratio of 76.9 percent. The dimensions just given are by way of example only, and the invention is applicable to other sizes of tires with different tire diameters and widths and for use on different rim diameters.

It is noted that although the specific example of the tire 10 just described having an outside diameter of 50.3 inches has approximately the same outside diameter as the prior art tires typically used on telescopic material handlers, the tire 10 has been designed as a much lower aspect ratio tire and thus has been designed for use on a larger diameter 28 inch rim as compared to the prior art tires which are designed for use on a 24 inch diameter rim. The prior art tires previously used on telescopic material handlers usually have an aspect ratio of 90 percent or greater.

In general, the tire 10 should have a relatively low aspect ratio of no greater than about 80 percent. Preferably the tire 10 is constructed to fit on a wheel rim of approximately 28 inches diameter.

As seen in FIG. 5, the axially outward facing surface 64 of circumferentially continuous sidewall protector rib 48 is located substantially above mid height 73 of the sidewall height 38 and more specifically lies entirely above sixty percent of the sidewall height 38. Further, the axially outward facing surface 64 can be described as lying entirely within the range 75 extending from a lower end 77 of about sixty percent to an upper end 79 of about eighty percent of the sidewall height 38. As seen in FIG. 5, the smooth continuous sidewall profile 70 can be described as being broken only by the axially outwardly projecting circumferentially non-continuous sidewall protector rib 50 and the axially outwardly projecting circumferentially continuous sidewall protector rib 48.

It will be appreciated that the dimensions of the tire 10 will change somewhat when the tire 10 is mounted on a wheel rim, inflated and loaded. The tire 10 is shaped and dimensioned such that when the tire is inflated and under load the rib 48 will still protrude at least as far as any other part of the sidewall 12. Thus with a tire 10 having the sidewall protector rib 48, if the tire is driven against a curb or the like the sidewall protector rib 48 will first engage the curb and will protect the other portions of the sidewall 12.

As can be seen in FIG. 5, the non-continuous sidewall protector rib 50 provides somewhat of a tapered transition to the larger continuous sidewall protector rib 48 and thus serves to provide a more gradual transition from the tread area 16 to the continuous sidewall protector rib 48 than would otherwise be the case. Thus, if the edge of the tire runs over a broken block or other obstacle or is starting to run up on a curb, the presence of the axially shorter non-continuous sidewall protector rib 50 may engage the obstacle before the more prominent continuous sidewall protector rib 48 does so, and thus help deflect the object away from the tire or help deflect the tire away from the object. This multi-tier or multi-step design provided by the axially shorter sidewall protector rib 50 and the axially longer sidewall protector rib 48 is used to progressively push off the sidewall intrusion and protect the sidewall from damage. This minimizes carcass strain while offering maximum protection.

Also it is noted that due to the proximity of the circumferentially continuous sidewall protector rib 48 to the tread area 16, the rubber compound from which the continuous sidewall protector rib 48 is molded can more easily be controlled to be tread compound rather than sidewall compound. As will be appreciated by those skilled in the art, a more wear resistant rubber compound is typically used for the tread area 16 whereas the rubber compound used for the sidewalls 12 and 14 typically includes components to provide more protection from ozone and sunlight.

As a result of the placement of the sidewall protector ribs 48 and 50 relatively high on the sidewall profile well beyond the sidewall midpoint, and as a result of appropriate construction of the shape of the sidewall profile 70 in combination with a low aspect ratio, the sidewall protector ribs 48 and 50 can be provided without any increase in the overall inflated tire width as compared to typical higher aspect ratio prior art tires not having any sidewall protection. This avoids an undesirable increase in overall inflated tire width which would occur from designs such as that of U.S. Pat. No. 6,666,248 which have sidewall protector ribs located approximately mid-sidewall height.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A pneumatic tire, comprising:
   first and second sidewalls;
   a tread area extending between the first and second sidewalls, the tread area including an inner tread surface and at least a first circumferential row of lugs extending radially outward from the inner tread surface adjacent the first sidewall; and
   a circumferentially continuous sidewall protector rib including a radially outer surface defined as an integral extension of the inner tread surface without any surface break line between the radially outer surface and the inner tread surface, and including an axially outer surface projecting axially at least as far as any other part of the first sidewall to protect the first sidewall from damaging engagement with foreign objects;
   wherein the first sidewall has a sidewall height extending radially from a radially innermost edge of the first sidewall to a radially outer ground engaging surface of the tread area; and
   the axially outer surface of the circumferentially continuous sidewall protector rib is located entirely above 60% of the sidewall height of the first sidewall.

2. The tire of claim 1, wherein:
   the axially outer surface of the circumferentially continuous sidewall protector rib slopes radially inward toward a rotational axis of the tire and axially inward toward an equatorial plane of the tire.

3. The tire of claim 1, wherein:
   the axially outer surface of the circumferentially continuous sidewall protector rib is located entirely in a range of from 60% to 80% of the sidewall height of the first sidewall.

4. A pneumatic tire, comprising:
   first and second sidewalls;
   a tread area extending between the first and second sidewalls, the tread area including an inner tread surface and at least a first circumferential row of lugs extending radially outward from the inner tread surface adjacent the first sidewall; and
   a circumferentially continuous sidewall protector rib including a radially outer surface defined as an integral extension of the inner tread surface without any surface break line between the radially outer surface and the inner tread surface, and including an axially outer surface projecting axially at least as far as any other part of the first sidewall to protect the first sidewall from damaging engagement with foreign objects;
   wherein the first sidewall includes an axially outer sidewall profile when viewed in a radial cross-section; and
   wherein the axially outer surface of the circumferentially continuous sidewall protector rib projects axially beyond the axially outer sidewall profile immediately adjacent the circumferentially continuous sidewall protector rib at least 0.25 inch.

5. A pneumatic tire, comprising:
   first and second sidewalls;
   a tread area extending between the first and second sidewalls, the tread area including an inner tread surface and at least a first circumferential row of lugs extending radially outward from the inner tread surface adjacent the first sidewall; and
   a circumferentially continuous sidewall protector rib including a radially outer surface defined as an integral extension of the inner tread surface without any surface break line between the radially outer surface and the inner tread surface, and including an axially outer surface projecting axially at least as far as any other part of the first sidewall to protect the first sidewall from damaging engagement with foreign objects;
   wherein each lug of the first circumferential row of lugs includes an axially outward facing outer surface including a step portion adjacent the inner tread surface, the step portions of the lugs of the first circumferential row of lugs forming a circumferentially broken sidewall protector rib located immediately radially outward of the circumferentially continuous sidewall protector rib and axially projecting from the first sidewall less than the axially outer surface of the circumferentially continuous sidewall protector rib.

6. The tire of claim 5, wherein:
   the axially outer surface of the circumferentially continuous sidewall protector rib slopes radially inward toward a rotational axis of the tire and axially inward toward an equatorial plane of the tire; and
   the axially outward facing outer surface of the step portions of the lugs of the first circumferential row of lugs slope radially inward toward the rotational axis of the tire and axially outward away from the equatorial plane of the tire.

7. The tire of claim 5, wherein:
   the circumferentially continuous sidewall protector rib has a radial width in a range of from 1.5 to 2.5 times a radial width of the circumferentially broken sidewall protector rib.

8. The tire of claim 5, wherein:
   the first sidewall includes an axially outer sidewall profile when viewed in a radial cross-section; and
   the axially outward facing outer surface radially outward of the step portion of each of the lugs of the first circumferential row of lugs coincides with the axially outer sidewall profile.

9. The tire of claim 8, wherein:
   the circumferentially continuous sidewall protector rib projects axially from the axially outer sidewall profile at least twice as far as does the circumferentially broken sidewall protector rib.

10. The tire of claim 8, wherein:
    the circumferentially continuous sidewall protector rib projects axially at least 0.25 inch beyond the axially outer sidewall profile.

11. A pneumatic tire, comprising:
    first and second sidewalls;
    a tread area extending between the first and second sidewalls, the tread area including an inner tread surface and at least a first circumferential row of lugs extending radially outward from the inner tread surface adjacent the first sidewall; and;
    a circumferentially continuous sidewall protector rib including a radially outer surface defined as an integral extension of the inner tread surface without any surface break line between the radially outer surface and the inner tread surface, and including an axially outer surface projecting axially at least as far as any other part of the first sidewall to protect the first sidewall from damaging engagement with foreign objects;
    wherein the tire has an aspect ratio of no greater than 80% and fits on a wheel rim of 28 inches diameter.

12. A pneumatic tire, comprising:
    first and second sidewalls;
    a tread portion extending between the first and second sidewalls, the tread portion including a radially inner tread base, and a plurality of lugs extending radially outward from the base, the first sidewall having a sidewall height extending radially from a radially innermost part of the first sidewall to a radially outer ground engaging surface of the tread portion;

a circumferentially continuous sidewall protector rib located entirely above 60% of the sidewall height, the circumferentially continuous sidewall protector rib projecting axially outward at least as far as any other part of the first sidewall when the tire is in an inflated loaded condition; and a circumferentially non-continuous sidewall protector rib located radially outward from and radially adjacent to the circumferentially continuous sidewall protector rib, the circumferentially non-continuous sidewall protector rib projecting axially outward beyond the first sidewall a distance less than does the circumferentially continuous sidewall protector rib.

13. The tire of claim 12, wherein:
the circumferentially continuous sidewall protector rib radially terminates adjacent the tread base.

14. The tire of claim 12, wherein:
the first sidewall includes a smooth continuously curved axially outer sidewall profile when viewed in a radial cross-section;

the plurality of lugs of the tread portion includes a first row of lugs adjacent the first sidewall, each lug of the first row of lugs includes an axially outer surface a radially outermost portion of which coincides with the sidewall profile; and the sidewall profile is broken only by the axially outwardly projecting circumferentially non-continuous sidewall protector rib and the axially outwardly projecting circumferentially continuous sidewall protector rib.

15. The tire of claim 14, wherein:
the circumferentially continuous sidewall protector rib projects axially outward beyond the axially outer sidewall profile of the first sidewall at least twice as far as does the circumferentially non-continuous sidewall protector rib.

16. The tire of claim 12, wherein:
the circumferentially continuous sidewall protector rib has a radial width of at least 1.9 times a radial width of the circumferentially non-continuous sidewall protector rib.

17. The tire of claim 12, wherein:
the circumferentially continuous sidewall protector rib has a radial width of at least 1.25 inch and projects axially outward by a distance of at least 0.25 inch beyond any immediately adjacent surface of the first sidewall.

18. The tire of claim 12, wherein the tire has an aspect ratio of no greater than 80% and fits on a wheel rim of 28 inches diameter.

19. A pneumatic tire, comprising:
first and second sidewall portions;

a tread portion extending between the first and second sidewall portions, the tread portion including a floor and at least a first circumferentially spaced row of lugs, each lug of the first row of lugs including an axially outer surface facing in generally the same axial direction as does the first sidewall, each axially outer surface including an axially outwardly projecting step projecting axially outward from the axially outer surface and adjoining the floor; and a circumferentially continuous sidewall protector rib projecting axially outward from the first sidewall portion and located radially inward of and radially adjacent to the axially outwardly projecting steps of the axially outer surfaces of the lugs of the first row of lugs, the circumferentially continuous sidewall protector rib projecting axially outward further than the axially outwardly projecting steps.

20. The tire of claim 19, wherein:
the circumferentially continuous sidewall protector rib projects axially outward at least as far as any other part of the first sidewall portion.

21. The tire of claim 20, wherein:
the axially outwardly projecting steps project axially outwardly from the first sidewall portion and define a circumferentially non-continuous sidewall protector rib concentrically disposed about the circumferentially continuous sidewall protector rib.

22. The tire of claim 19, wherein the tire has an aspect ratio of no greater than 80%.

23. The tire of claim 19, wherein the tire fits on a wheel rim of 28 inches in diameter.

* * * * *